United States Patent
Grant et al.

(10) Patent No.: US 8,376,541 B2
(45) Date of Patent: *Feb. 19, 2013

(54) METHOD OF EJECTING SOLVENT-BASED INK COMPOSITION COMPRISING PYRROLIDINONE SOLVENT

(75) Inventors: Alexander Grant, Balmain (AU); Simon Fielder, Balmain (AU); Damon Donald Ridley, Balmain (AU); Kia Silverbrook, Balmain (AU)

(73) Assignee: Zamtec Ltd, Dublin (IE)

( * ) Notice: Subject to any disclaimer, the term of this patent is extended or adjusted under 35 U.S.C. 154(b) by 529 days.

This patent is subject to a terminal disclaimer.

(21) Appl. No.: 12/557,518

(22) Filed: Sep. 11, 2009

(65) Prior Publication Data

US 2011/0063370 A1    Mar. 17, 2011

(51) Int. Cl.
*C09D 11/00* (2006.01)
*B41J 2/05* (2006.01)

(52) U.S. Cl. ............ 347/100; 347/95; 347/56; 106/31.6

(58) Field of Classification Search ............... 347/56, 347/95–100; 106/31.6, 31.78, 31.86; 428/195.1; 523/160, 161; 482/195.1
See application file for complete search history.

(56) References Cited

U.S. PATENT DOCUMENTS

| | | | |
|---|---|---|---|
| 4,155,767 A | 5/1979 | Specht et al. | |
| 4,210,566 A | 7/1980 | Murray | |
| 4,395,287 A | 7/1983 | Kobayashi et al. | |
| 5,076,843 A | 12/1991 | Acitelli et al. | |
| 5,713,988 A | 2/1998 | Belmont et al. | |
| 6,169,129 B1 | 1/2001 | Mahmud et al. | |
| 6,379,444 B1 | 4/2002 | Adkins et al. | |
| 6,444,019 B1 | 9/2002 | Zou et al. | |
| 6,869,986 B1 | 3/2005 | Millot et al. | |
| 7,052,537 B2 | 5/2006 | Uhlir-Tsang | |

(Continued)

FOREIGN PATENT DOCUMENTS

| | | |
|---|---|---|
| EP | 1174475 B1 | 1/2002 |
| JP | 2002-114929 A | 4/2002 |

(Continued)

*Primary Examiner* — Matthew Luu
*Assistant Examiner* — Rut Patel
(74) *Attorney, Agent, or Firm* — Cooley LLP (57) ABSTRACT

A method of ejecting ink from a thermal inkjet printhead. The method includes the steps of: (i) supplying an ink to at least one nozzle chamber of the printhead; and (ii) actuating a heater element in the nozzle chamber and heating the ink to a temperature sufficient to form a bubble therein, thereby causing the ink to be ejected from a nozzle opening associated with the nozzle chamber. The ink is a solvent-based ink composition including: (a) 20-80 wt. % of a compound of formula (A);

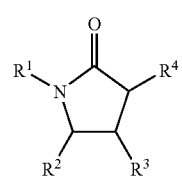

(A)

wherein: $R^1$ is $C_{1-6}$ alkyl; and each of $R^2$, $R^3$ and $R^4$ is independently selected from H, $C_{1-6}$ alkyl, halogen, OH, and $C_{1-6}$ alkoxy;
(b) 10-70 wt. % of a $C_{1-6}$ alcohol; and
(c) 0.01-25 wt. % of a colorant.

15 Claims, 3 Drawing Sheets

U.S. PATENT DOCUMENTS

| | | |
|---|---|---|
| 7,152,968 B2 | 12/2006 | Soga et al. |
| 7,306,326 B2 | 12/2007 | Silverbrook |
| 7,427,130 B2 | 9/2008 | Furukawa et al. |
| 7,682,435 B2 | 3/2010 | Mizutani et al. |
| 7,789,955 B1 | 9/2010 | Gamblin et al. |
| 8,080,102 B2 * | 12/2011 | Grant et al. ............ 106/31.78 |
| 2006/0211791 A1 | 9/2006 | Burns et al. |
| 2008/0006175 A1 | 1/2008 | King et al. |
| 2008/0119593 A1 | 5/2008 | Stramel et al. |
| 2009/0246377 A1 | 10/2009 | Robertson et al. |
| 2010/0328401 A1 | 12/2010 | Robertson et al. |
| 2011/0063370 A1 | 3/2011 | Grant et al. |
| 2011/0063372 A1 | 3/2011 | Grant et al. |
| 2011/0063373 A1 | 3/2011 | Grant et al. |
| 2011/0064919 A1 | 3/2011 | Grant et al. |
| 2011/0064920 A1 | 3/2011 | Grant et al. |
| 2011/0064921 A1 | 3/2011 | Grant et al. |
| 2011/0064923 A1 | 3/2011 | Grant et al. |

FOREIGN PATENT DOCUMENTS

| | | |
|---|---|---|
| WO | WO 01/90261 A2 | 11/2001 |

* cited by examiner

METHOD OF EJECTING SOLVENT-BASED INK COMPOSITION COMPRISING PYRROLIDINONE SOLVENT

CO-PENDING APPLICATIONS

The following applications have been filed by the Applicant simultaneously with the present application:

| 8,101,012 | 12/557,520 | 12/557,520 | 8,110,032 | 12/557,525 | 12/557,526 |
|---|---|---|---|---|---|
| 12/557,527 | | | | | |

The disclosures of these co-pending applications are incorporated herein by reference.

CROSS REFERENCES

The following patents or patent applications filed by the applicant or assignee of the present invention are hereby incorporated by cross-reference.

| | | | | |
|---|---|---|---|---|
| 6,755,509 | 7,222,943 | 7,188,419 | 7,168,166 | 7,086,719 |
| 12/246,332 | 12/246,336 | 7,246,886 | 7,128,400 | 7,108,355 |
| 6,991,322 | 7,287,836 | 7,118,197 | 10/728,784 | 7,364,269 |
| 7,077,493 | 6,962,402 | 10/728,803 | 7,147,308 | 10/728,779 |
| 7,118,198 | 7,168,790 | 7,172,270 | 7,229,155 | 6,830,318 |
| 7,195,342 | 7,175,261 | 7,465,035 | 7,108,356 | 7,118,202 |
| 10/773,186 | 7,134,744 | 7,134,743 | 7,182,439 | 7,210,768 |
| 7,465,036 | 7,134,745 | 7,156,484 | 7,118,201 | 7,111,926 |
| 7,431,433 | 7,401,901 | 7,468,139 | 11/744,885 | 11/097,308 |
| 7,328,978 | 7,334,876 | 7,147,306 | 7,448,734 | 7,425,050 |
| 11/014,764 | 11/014,763 | 7,331,663 | 7,360,861 | 7,328,973 |
| 7,427,121 | 7,407,262 | 7,303,252 | 7,249,822 | 11/014,762 |
| 7,311,382 | 7,360,860 | 7,364,257 | 7,390,075 | 7,350,896 |
| 7,429,096 | 7,384,135 | 7,331,660 | 7,416,287 | 11/014,737 |
| 7,322,684 | 7,322,685 | 7,311,381 | 7,270,405 | 7,303,268 |
| 7,470,007 | 7,399,072 | 7,393,076 | 11/014,750 | 11/014,749 |
| 7,249,833 | 11/014,769 | 11/014,729 | 7,331,661 | 11/014,733 |
| 7,300,140 | 7,357,492 | 7,357,493 | 11/014,766 | 7,380,902 |
| 7,284,816 | 7,284,845 | 7,255,430 | 7,390,080 | 7,328,984 |
| 7,350,913 | 7,322,671 | 7,380,910 | 7,431,424 | 7,470,006 |
| 11/014,732 | 7,347,534 | 7,441,865 | 7,469,989 | 7,367,650 |
| 7,469,990 | 11/688,863 | 11/688,864 | 11/688,865 | 7,364,265 |
| 11/741,766 | 12/014,767 | 12/014,768 | 12/014,769 | 12/014,770 |
| 12/014,771 | 12/014,772 | 12/049,371 | 12/049,372 | 12/049,373 |
| 12/146,399 | 12/334,519 | 12/339,039 | | |

FIELD OF THE INVENTION

This invention relates to inkjet inks for thermal inkjet printers. It has been developed primarily to enable thermal inkjet printing onto a wide range of substrates, including non-porous substrates.

BACKGROUND OF THE INVENTION

Thermal bubble-forming inkjet printheads function by generating a certain amount of heat in the printing fluid contained in a nozzle chamber. This heat causes a bubble to form which eventually collapses as the fluid is forced through a nozzle. The collapse of the bubble then causes more fluid to enter the nozzle chamber for the same process to begin again.

Due to the ability of water to form rapidly a bubble at elevated temperature, printers equipped with such thermal inkjet printheads typically use water-based ink formulations.

However, although it is possible to print directly onto specially treated non-porous and semi-porous substrates, water-based inkjet inks are essentially limited to applications that use porous media, such as office papers and textiles. Accordingly, most printers that use thermal inkjet printheads are usually for the SOHO (small office home office) market.

In contrast, piezo printheads offer a wide degree of ink formulation flexibility, since droplet ejection occurs through a piezoelectric force rather than a bubble forming mechanism. Because of this, many different ink chemistries can be used in piezo printheads, such as UV curable, solvent-based, hot-melt and oil-based, as well as water-based. The output from the piezo printers is equally diverse, addressing a host of graphics market segments including packaging, wide-format displays, CD and glass decoration. Taking wide-format printing as an example, there are a large number of solvent-based printers on the market all of which use piezo printheads. These print onto a range of media, including low cost non-porous and semi-porous substrates such as uncoated vinyls and polyesters.

The Applicant has developed a range of bend-actuated printheads, which do not rely on bubble formation for ink ejection and, like piezo printheads, can be used with either aqueous or non-aqueous inks. Some of the Applicant's bend-actuated inkjet printheads are described in, for example, U.S. Pat. No. 7,416,280; U.S. Pat. No. 6,902,255; US 2008/0129793; and US 2008/0225082, the contents of which are herein incorporated by reference.

The present Applicant has also developed a range of thermal bubble-forming printheads, as described in, for example, U.S. Pat. No. 6,755,509; U.S. Pat. No. 7,246,886; and U.S. Pat. No. 7,401,910, the contents of which are incorporated herein by reference.

The Applicant's thermal bubble-forming inkjet printers currently offer high-resolution and high-speed printing (e.g. 60 pages per minute at 1600 dpi) of aqueous-based inks for SOHO markets. These aqueous-based inks are suitable for printing onto porous and semi-porous media. However, it would be desirable to provide thermal bubble-forming inkjet printheads, which can print ink onto a wider range of substrates, including non-porous media. This would allow thermal inkjet printheads to compete fully with piezo printers, offering high-resolution and high-speed inkjet printing for a wide range of print media.

SUMMARY OF THE INVENTION

In a first aspect, there is provided a solvent-based ink composition for a thermal inkjet printhead, the ink composition comprising:

(a) 20-80 wt. % of a compound of formula (A);

(A)

wherein:
$R^1$ is $C_{1-6}$ alkyl; and
each of $R^2$, $R^3$ and $R^4$ is independently selected from H, $C_{1-6}$ alkyl, halogen, OH, and $C_{1-6}$ alkoxy;
(b) 10-70 wt. % of a $C_{1-6}$ alcohol;
(c) 0.01-25 wt. % of a colorant.
Optionally, $R^1$ is $C_{1-6}$ alkyl; and each of $R^2$, $R^3$ and $R^4$ is H.

Optionally, the compound of formula (A) is N-methyl-2-pyrrolidinone or N-ethyl-2-pyrollidinone.

Optionally, in all relevant aspects of the present invention, the $C_{1-6}$ alcohol is ethanol.

Optionally, in all relevant aspects of the present invention, the colorant is a dye or a pigment.

Optionally, in all relevant aspects of the present invention, the ink composition comprises 0.001-10 wt. % of a surfactant.

Optionally, in all relevant aspects of the present invention, the surfactant is a nonionic surfactant.

Optionally, in all relevant aspects of the present invention, the surfactant is non-polymeric.

Optionally, in all relevant aspects of the present invention, the composition does not comprise an acrylate polymer or copolymer.

Optionally, in all relevant aspects of the present invention, the composition does not comprise any polymers.

Optionally, the ink composition consists essentially of or consists only of the compound of formula (A), the $C_{1-6}$ alcohol and the colorant.

Optionally, the ink composition consists only of the compound of formula (A), the $C_{1-6}$ alcohol, the colorant and 0.01-10 wt. % of a surfactant.

In a second aspect, there is provided a method of ejecting ink from a thermal inkjet printhead, the method comprising the steps of:

(i) supplying an ink to at least one nozzle chamber of the printhead; and (ii) actuating a heater element in the nozzle chamber and heating the ink to a temperature sufficient to form a bubble therein, thereby causing the ink to be ejected from a nozzle opening associated with the nozzle chamber, wherein the ink is a solvent-based ink composition comprising:

(a) 20-80 wt. % of a compound of formula (A);

(A)

wherein:

$R^1$ is $C_{1-6}$ alkyl; and each of $R^2$, $R^3$ and $R^4$ is independently selected from H, $C_{1-6}$ alkyl, halogen, OH, and $C_{1-6}$ alkoxy;

(b) 10-70 wt. % of a $C_{1-6}$ alcohol;

(c) 0.01-25 wt. % of a colorant.

Optionally, in all relevant aspects of the present invention, the ink is ejected onto a non-porous or a semi-porous substrate.

Optionally, in all relevant aspects of the present invention, the ink adheres to the substrate.

Optionally, in all relevant aspects of the present invention, the substrate is a plastics substrate.

Optionally, in all relevant aspects of the present invention, the substrate is comprised of untreated vinyl or polyester.

Optionally, in all relevant aspects of the present invention, the heater element has a mass of less than 1 nanogram.

Optionally, in all relevant aspects of the present invention, the heater element is suspended in the ink chamber, such that the ink composition envelops the heater element.

Optionally, in all relevant aspects of the present invention, an actuation energy for the heater element is less than 500 nJ.

Optionally, in all relevant aspects of the present invention, the printhead is a stationary pagewidth printhead.

Optionally, in all relevant aspects of the present invention, the printhead comprises at least 50,000 nozzles.

In a third aspect, there is provided a solvent-based ink composition for a thermal inkjet printhead, the ink composition comprising:

(a) 20-80 wt. % of a compound of formula (B);

(B)

wherein:

$R^5$ is a $C_{1-6}$ alkyl group and $R^6$ is a $C_{1-6}$ alkyl group; or $R^5$ and $R^6$ are together joined to form a $C_{3-12}$ cycloalkylene group;

(b) 10-70 wt. % of a $C_{1-6}$ alcohol;

(c) 0.01-25 wt. % of a colorant.

Optionally, the compound of formula (B) is methylethylketone.

Optionally, the compound of formula (B) is cyclohexanone.

In a fourth aspect, there is provided a method of ejecting ink from a thermal inkjet printhead, the method comprising the steps of:

(i) supplying an ink to at least one nozzle chamber of the printhead; and (ii) actuating a heater element in the nozzle chamber and heating the ink to a temperature sufficient to form a bubble therein, thereby causing the ink to be ejected from a nozzle opening associated with the nozzle chamber, wherein the ink is a solvent-based ink composition comprising:

(a) 20-80 wt. % of a compound of formula (B);

(B)

wherein:

$R^5$ is a $C_{1-6}$ alkyl group and $R^6$ is a $C_{1-6}$ alkyl group; or

$R^5$ and $R^6$ are together joined to form a $C_{3-12}$ cycloalkylene group;

(b) 10-70 wt. % of a $C_{1-6}$ alcohol;

(c) 0.01-25 wt. % of a colorant.

In a fifth aspect, there is provided a solvent-based ink composition for a thermal inkjet printhead, the ink composition comprising:

(a) 20-80 wt. % of a compound of formula (C);

(C)

wherein:

$R^7$ is a $C_{2-12}$ alkyl group interrupted with 0, 1, 2 or 3 oxygen atoms;

(b) 10-70 wt. % of a $C_{1-6}$ alcohol;
(c) 0.01-25 wt. % of a colorant.

Optionally, $R^7$ is a $C_{4-8}$ alkyl group interrupted with 0, 1 or 2 oxygen atoms.

Optionally, the compound of formula (C) is selected from the group consisting of: hexyl acetate; carbitol acetate; butyldiglycol acetate; and methoxypropyl acetate.

In a sixth aspect, there is provided a method of ejecting ink from a thermal inkjet printhead, the method comprising the steps of:
(i) supplying an ink to at least one nozzle chamber of the printhead; and
(ii) actuating a heater element in the nozzle chamber and heating the ink to a temperature sufficient to form a bubble therein, thereby causing the ink to be ejected from a nozzle opening associated with the nozzle chamber,
wherein the ink is a solvent-based ink composition comprising:
(a) 20-80 wt. % of a compound of formula (C);

(C)

wherein:
$R^7$ is a $C_{2-12}$ alkyl group interrupted with 0, 1, 2 or 3 oxygen atoms;
(b) 10-70 wt. % of a $C_{1-6}$ alcohol;
(c) 0.01-25 wt. % of a colorant.

In a seventh aspect, there is provided a solvent-based ink composition for a thermal inkjet printhead, the ink composition comprising:
(a) 20-80 wt. % of a compound of formula (D);

(D)

wherein:
each of $R^8$ and $R^9$ is independently selected from a $C_{1-12}$ alkyl group interrupted with 0, 1, 2 or 3 oxygen atoms; or $R^8$ and $R^9$ are together joined to form a $C_{3-12}$ cycloalkylene group;
(b) 10-70 wt. % of a $C_{1-6}$ alcohol;
(c) 0.01-25 wt. % of a colorant.

Optionally, at least one of $R^8$ and $R^9$ includes one or more oxygen atom interruptions.

Optionally, the compound of formula (D) is selected from the group consisting of: dipropylene glycol monomethyl ether, dipropylene glycol dimethyl ether, diethylene glycol diethyl ether, propylene glycol butyl ether, dipropylene glycol dimethyl ether, dipropylene glycol butyl ether, diethylene glycol monopropyl ether, propylene glycol propyl ether, tetraethylene glycol dimethyl ether, methyl butyl ether, tripropylene glycol methyl ether, tetrahydrofuran, and tetrahydropyran.

In an eighth aspect, there is provided a method of ejecting ink from a thermal inkjet printhead, the method comprising the steps of:
(i) supplying an ink to at least one nozzle chamber of the printhead; and
(ii) actuating a heater element in the nozzle chamber and heating the ink to a temperature sufficient to form a bubble therein, thereby causing the ink to be ejected from a nozzle opening associated with the nozzle chamber,
wherein the ink is a solvent-based ink composition comprising:
(a) 20-80 wt. % of a compound of formula (D);

(D)

wherein:
each of $R^8$ and $R^9$ is independently selected from a $C_{1-12}$ alkyl group interrupted with 0, 1, 2 or 3 oxygen atoms; or $R^8$ and $R^9$ are together joined to form a $C_{3-12}$ cycloalkylene group;
(b) 10-70 wt. % of a $C_{1-6}$ alcohol;
(c) 0.01-25 wt. % of a colorant.

In a further aspect, there is provided a printer comprising:
an ink reservoir containing a respective ink; and
a thermal inkjet printhead in fluid communication with the ink reservoir, wherein the ink is any one of the solvent-based ink compositions described above.

Optionally, the thermal inkjet printhead comprises a plurality of nozzles, each of the plurality of nozzles comprising:
a nozzle chamber containing the ink, the nozzle chamber having a nozzle opening for ejection of the ink; and
a heater element in contact with the ink, the heater element being configured for heating the ink to a temperature sufficient to form a bubble therein and thereby cause ejection of the ink from the nozzle opening.

In a further aspect, there is provided an ink cartridge for a thermal inkjet printhead, the ink cartridge containing any one of the solvent-based ink compositions described above.

Optionally, the ink cartridge comprises a thermal inkjet printhead integrated therewith.

In a further aspect, there is provided a substrate having any one of the ink compositions described above disposed thereon.

Optionally, the substrate is a semi-porous or non-porous substrate.

Optionally, the substrate is a vinyl substrate.

BRIEF DESCRIPTION OF THE DRAWINGS

Optional embodiments of the present invention will now be described by way of example only with reference to the accompanying drawings, in which:—

DETAILED DESCRIPTION OF THE INVENTION

The present invention provides solvent-based ink compositions, which may be jetted from a thermal inkjet printhead of the type that rapidly generates a bubble in each nozzle chamber in order to eject ink. The overwhelming preference of the prior art is to eject aqueous ink compositions from thermal inkjet printheads. However, as foreshadowed above, aqueous ink compositions limit the number of applications in which thermal inkjet printheads may be used. The present invention, which makes use of non-aqueous ink compositions, expands the number of possible applications for thermal inkjet printheads by enabling such printheads to print ink which adheres to non-porous and semi-porous print media. Hence, the use of thermal inkjet printheads in wide-format and other markets is a realistic possibility using the present invention.

The ink compositions according to the present invention are characterized by their relative simplicity, especially when compared to their solvent-based counterparts typically used in piezo printheads. A typical solvent-based ink composition used in piezo printheads has a solvent system comprised of about five or more different solvents. Moreover, these solvent-based ink compositions usually comprise one or more polymers (e.g. acrylate polymers) to aid dispersion of colorant(s) in the ink. It is an advantage of the present invention that the solvent system comprises only two solvents and does not normally comprise any polymers.

The absence of polymers not only reduces cost, but also minimizes the propensity for non-volatile residues to build up on the thermal heater elements in the printheads (otherwise known as "kogation"). It is surprising that relatively simple solvent-based ink compositions can jet effectively and adhere to non-porous substrates in the absence of polymers and, in particular, acrylate polymers.

The ink compositions of the present invention generally comprise three main components, each of which will be discussed in more detail. The first component is a solvent, which promotes adhesion of the ink to non-porous surfaces (e.g. vinyl surfaces). The second component promotes bubble formation in the thermal printhead. The third component is a colorant, which may be either a dye or pigment.

Although inks may be formulated using only these three components, a fourth component may additionally be present for improving the film appearance of the ink on non-porous media.

The first and second components together typically make up at least 70% wt. %, at least 80 wt. % or at least 90 wt. % of the ink composition.

The amount of the first component ("adhesion-promoting solvent") is in the range of 20 to 80 wt. %, based on the total weight of the ink composition. Optionally, the amount of first component is in the range of 30 to 60 wt. %, or optionally 40 to 50 wt. %.

The amount of the second component ("bubble-promoting solvent") is in the range of 10 to 70 wt. %, based on the total weight of the ink composition. Optionally, the amount of second component is in the range of 30 to 60 wt. %, or optionally 40 to 50 wt. %.

The ratio of the first and second components may be in the range of 3:1 to 1:3, optionally 2:1 to 1:2 or optionally 1.5:1 to 1:1.5. In a preferred ink composition, the first and second components are present in approximately equal amounts i.e. about a 1:1 ratio.

The amount of the third component ("colorant") is in the range of 0.01 to 25 wt. %, based on the total weight of the ink composition. The exact amount of third component will usually depend on whether the colorant is a dye or pigment, as well as the characteristics of the dye or colorant (e.g. optical density) and other printing parameters (e.g. droplet size, dot density etc). Optionally, the amount of third component is in the range of 0.1 to 10 wt. %, or optionally 1 to 5 wt. %.

The amount of fourth component ("film appearance improver"), when present in the ink composition, is in the range of 0.01 to 10 wt. %. Optionally, the amount of fourth component is in the range of 0.05 to 5 wt. %, or optionally 0.1 to 1 wt. %.

The ink composition may consist essentially of the first, second and third components. In other words, the first, second and third components together may comprise at least 90 wt. %, at least 95 wt. %, or least 98 wt. % of the ink composition.

In some embodiments, the ink composition may consist of only the first, second and third components. In other embodiments, the ink composition may consist of only the first, second, third and fourth components.

Typically, the ink composition does not contain any acrylate polymers, which are usually used in solvent-based ink compositions described in the prior art. Alternatively, the ink composition may not contain any polymers whatsoever.

Adhesion-Promoting Solvent

The Applicant has observed that certain types of solvent interact strongly with non-porous substrates, whilst also being jettable from a thermal inkjet printhead. In particular, some solvents adhere strongly with a vinyl print media and leave a film impression, which cannot be easily removed. By contrast, water and ethanol do not leave any impression on vinyl surfaces.

A first type of adhesion-promoting solvent is of formula (A):

(A)

wherein:
$R^1$ is $C_{1-6}$ alkyl; and
each of $R^2$, $R^3$ and $R^4$ is independently selected from H, $C_{1-6}$ alkyl, halogen, OH, and $C_{1-6}$ alkoxy.

Typical examples of a solvent of formula (A) are N-methyl-2-pyrrolidinone (NMP) and N-ethyl-2-pyrollidinone (NEP).

A second type of adhesion-promoting solvent is of formula (B):

(B)

wherein:
$R^5$ is a $C_{1-6}$ alkyl group and $R^6$ is a $C_{1-6}$ alkyl group; or
$R^5$ and $R^6$ are together joined to form a $C_{3-12}$ cycloalkylene group;

Typical examples of a solvent of formula (B) are methyl ethyl ketone (MEK), methyl propyl ketone, methyl butyl ketone, cyclohexanone, cyclopentanone, cycloheptanone, cyclooctanone and isophorone.

A third type of adhesion-promoting solvent is of formula (C):

(C)

wherein:

R[7] is a $C_{2-12}$ alkyl group interrupted with 0, 1, 2 or 3 oxygen atoms.

Typical examples of a solvent of formula (C) are hexyl acetate, ethyl acetate, butyl acetate, carbitol acetate [2-(2-ethoxyethoxy)ethyl acetate], isooctyl acetate, butyl carbitol acetate [2-(2-butoxyethoxy)ethyl acetate], butyldiglycol acetate [2-(2-butoxyethoxy)ethyl acetate], and methoxypropyl acetate.

A fourth type of adhesion-promoting solvent is of formula (D):

(D)

wherein:

each of R[8] and R[9] is independently selected from a $C_{1-12}$ alkyl group interrupted with 0, 1, 2 or 3 oxygen atoms; or R[8] and R[9] are together joined to form a $C_{3-12}$ cycloalkylene group.

Typical examples of a solvent of formula (D) are dipropylene glycol monomethyl ether, dipropylene glycol dimethyl ether, diethylene glycol diethyl ether, propylene glycol butyl ether, dipropylene glycol dimethyl ether, dipropylene glycol butyl ether, diethylene glycol monopropyl ether, propylene glycol propyl ether, tetraethylene glycol dimethyl ether, methyl butyl ether, tripropylene glycol methyl ether, tetrahydrofuran and tetrahydropyran.

The term "alkyl" is used herein to refer to alkyl groups in both straight and branched forms. Unless stated otherwise, the alkyl group may be interrupted with 1, 2 or 3 heteroatoms selected from O, NH or S. For example, an O atom interruption in a C—C bond provides an ether. Alternatively, an O atom interruption in a C—H bond provides an alcohol. Hence, ethers and alcohols are within the ambit of "alkyl" as defined herein.

Unless stated otherwise, the alkyl group may also be interrupted with 1, 2 or 3 double and/or triple bonds. However, the term "alkyl" usually refers to alkyl groups having no double or triple bond interruptions. Where alkenyl, ether, alkoxy etc. groups are specifically mentioned, this is not intended to be construed as a limitation on the definition of "alkyl" above.

Where reference is made to, for example, $C_{1-6}$ alkyl, it is meant the alkyl group may contain any number of carbon atoms between 1 and 6. By way of example, $C_{1-6}$ alkyl may encompass groups, such as methyl, ethyl, propyl (including n-propyl, isopropyl etc), butyl (including n-butyl, t-butyl etc), pentyl, hexyl, butenyl, pentenyl, hexenyl, iso-propenyl, methoxypropyl, ethoxyethyl, methoxymethyl, ethoxybutyl etc.

The term "alkyl" usually refers to acyclic alkyl groups, but it may also include cycloalkyl groups.

As used herein, the term "cycloalkyl" includes cycloalkyl, polycycloalkyl, and cycloalkenyl groups, as well as combinations of these with linear alkyl groups (e.g. a cycloalkyl group including alkyl substituent(s) attached to the ring). The cycloalkyl group may be interrupted with 1, 2 or 3 heteroatoms selected from O, N or S. Such cylcoalkyl groups may be in the form of a cycloalkyl ring substituted with, for example, alkoxy group(s) or they may be in the form of a heterocylocalkyl group. Examples of heterocycloalkyl groups are pyrrolidino, morpholino, piperidino etc. However, the term "cycloalkyl" usually refers to cycloalkyl groups having no heteroatom interruptions. Examples of cycloalkyl groups include cyclopentyl, cyclohexyl, cyclohexenyl, cyclohexylmethyl and adamantyl groups.

The term "halogen" or "halo" is used herein to refer to any of fluorine, chlorine, bromine and iodine. Usually, however, halogen refers to chlorine or fluorine substituents.

Bubble-Forming Solvent

Although the adhesion-promoting solvents described above have an inherent bubble-forming characteristic (as well as good adhesion of vinyl substrates), the ability of these solvents to form bubbles in a thermal inkjet device is improved markedly by the addition of a $C_{1-6}$ alcohol. For the avoidance of doubt, the term "$C_{1-6}$ alcohol" as used herein refers to alcohol compounds having from 1 to 6 carbon atoms and only one hydroxyl group.

Examples of suitable $C_{1-6}$ alcohols are methanol, ethanol, propanol (e.g. isopropanol), butanol, pentanol and hexanol. A preferred $C_{1-6}$ alcohol for use as the bubble-forming solvent in the present invention is ethanol.

Colorant

As mentioned herein, the colorant may be a dye or a pigment. It is an advantage of the present invention that the ink composition may comprises either a dye-based colorant or a pigment-based colorant.

Inkjet colorants will be well-known to the person skilled in the art and the present invention is not limited to any particular type of dye or pigment.

Pigments suitable for use in the present invention may be inorganic pigments or organic pigments. Examples are carbon black, Cadmium Red, Molybdenum Red, Chrome Yellow, Cadmium Yellow, Titan Yellow, chromium oxide, Viridian, Titan Cobalt Green, Ultramarine Blue, Prussian Blue, Cobalt Blue, diketopyrrolo-pyrrole, anthraquinone, benzimidazolone, anthrapyrimidine, azo pigments, phthalocyanine pigments (including naphthlocyanine pigments), uinacridone pigments, isoindolinone pigments, dioxazine pigments, indanthrene pigments, perylene pigments, perinone pigments, thioindigo pigments, quinophthalone pigments, and metal complex pigments. Some specific examples of suitable pigments, which may be used in the present invention, are Pigment 15:3, Pigment V19, Pigment Y151 and Pigment PK-7.

Dyes suitable for use in the present invention include include azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes (including naphthalocyanine dyes), and metal phthalocyanine dyes (including metal naphthalocyanine dyes).

Some specific examples of suitable dyes, which may used in the present invention, are Solvent red 8, Solvent blue 70, Solvent yellow 82 and Solvent black 27.

The pigments and dyes can be used either individually or as a combination of two or more thereof.

The average particle size of pigment particles is optionally in the range of 50 to 500 nm.

Film Appearance Improver

A fourth component may be included in the ink compositions of the present invention in order to improve the film appearance of the ink when deposited on a non-porous substrate e.g. vinyl or polyester substrate.

Usually, the film appearance improver is a surfactant contained in the ink composition in an amount of from 0.001 to 10 wt. %. Optionally, the surfactant is contained in an amount of from 0.01 to 5 wt. %, or from 0.05 to 2 wt. %, or from 0.1 to 1 wt. %.

The surfactant, when present, is typically a nonionic surfactant. Typically, the nonionic surfactant is non-polymeric.

Surfactants suitable for use in the present invention include fluorosurfactants (e.g. ethoxylated fluorosurfactants). Some specific examples of fluorosurfactants suitable for improving the film appearance of ink compositions according to the present invention are Zonyl® FSO and Zonyl® FSO-100.

Other specific examples of surfactants suitable for improving the film appearance of ink compositions according to the present invention include Tego Wet® 450, Tegoglide® 410, Twin® 400, Tego Wet® 270 and Tegoglide® 482.

Although ink compositions according to the present invention advantageously provide excellent print quality and jettability in the absence of polymer additives (especially acrylate polymers), certain polymers may improve the film appearance of the ink when printed. For example, vinyl polymers may improve the film appearance of the ink when printed on vinyl substrates. An example of a vinyl polymer additive is a high molecular weight copolymer of vinyl chloride and vinyl acetate (e.g. UCAR™ VYHH). Such polymer additives may be included in an amount of from 0.01 to 5 wt. %, or from 0.05 to 2 wt. %, or from 0.1 to 1 wt. %. However, it is usually preferred to provide ink compositions, which are completely free of any polymer additives.

Thermal Inkjet Printheads

The solvent-based ink compositions according to the present invention are designed to be used with thermal inkjet printheads. There now follows a brief description of one of the Applicant's thermal inkjet printheads, as described in U.S. Pat. No. 7,303,930, the contents of which is herein incorporated by reference.

Figure 1:
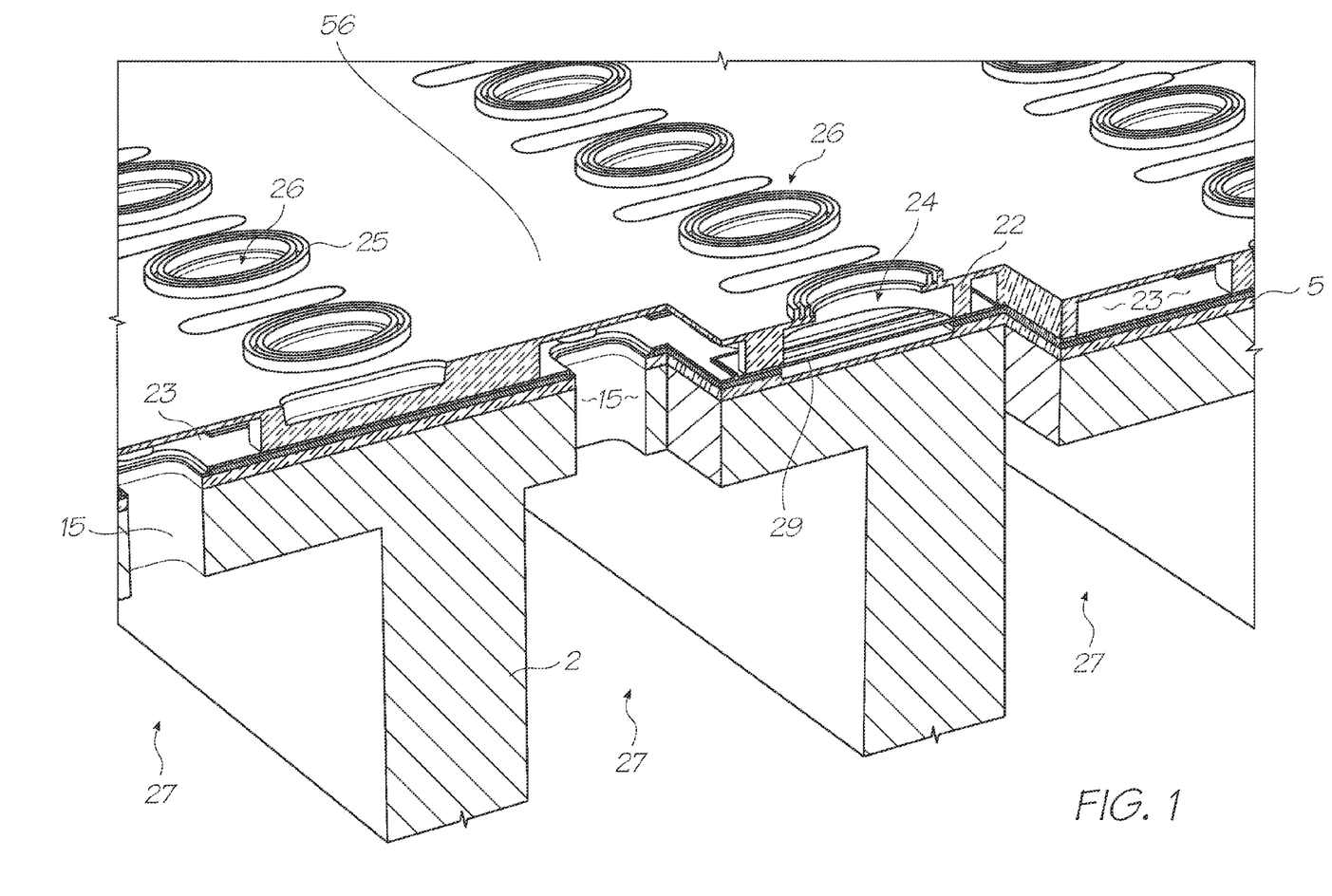
FIG. 1 is a perspective view of part of a thermal inkjet printhead.
Figure 2:
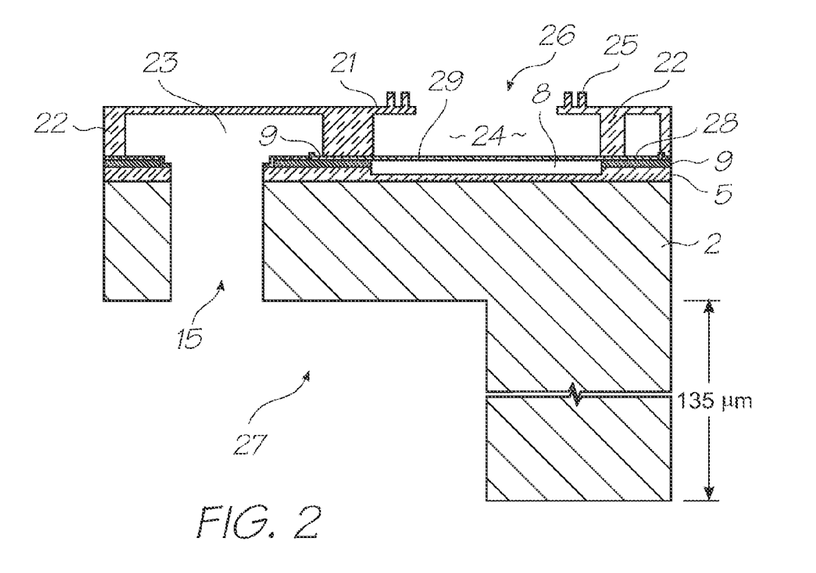
FIG. 2 is a side view of one of the nozzle assemblies shown in FIG. 1.
Figure 3:
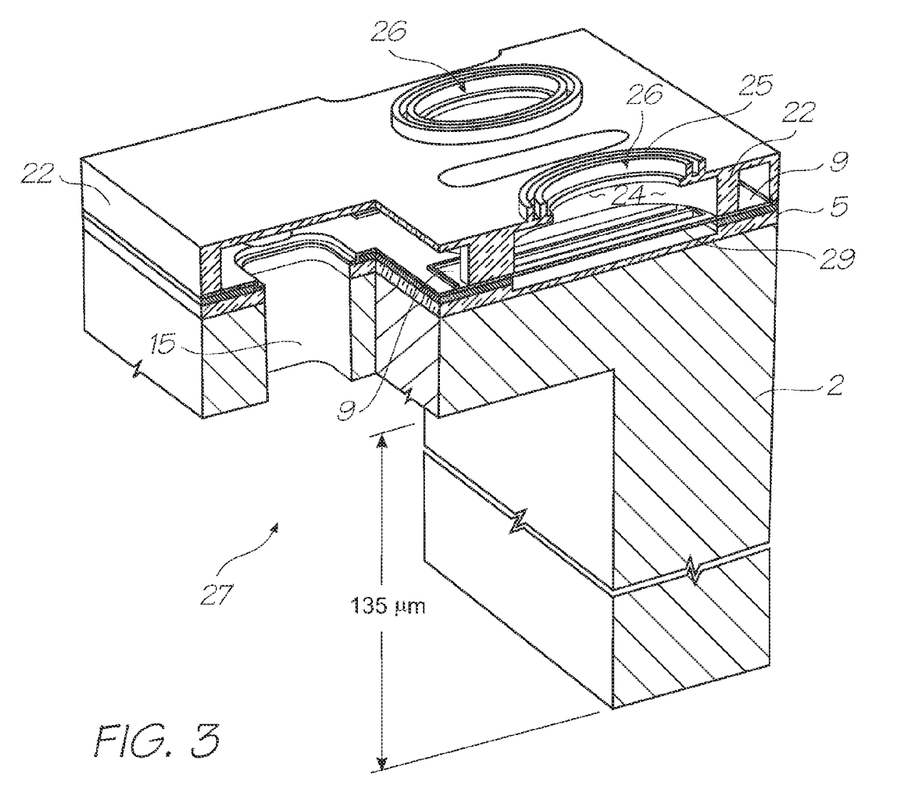
FIG. 3 is a perspective of the nozzle assembly shown in FIG. 2.

Referring to FIG. 1, there is shown part of printhead comprising a plurality of nozzle assemblies. FIGS. 2 and 3 show one of these nozzle assemblies in side-section and cutaway perspective views.

Each nozzle assembly comprises a nozzle chamber 24 formed by MEMS fabrication techniques on a silicon wafer substrate 2. The nozzle chamber 24 is defined by a roof 21 and sidewalls 22 which extend from the roof 21 to the silicon substrate 2. As shown in FIG. 1, each roof is defined by part of a nozzle plate 56, which spans across an ejection face of the printhead. The nozzle plate 56 and sidewalls 22 are formed of the same material, which is deposited by PECVD over a sacrificial scaffold of photoresist during MEMS fabrication. Typically, the nozzle plate 56 and sidewalls 21 are formed of a ceramic material, such as silicon dioxide or silicon nitride. These hard materials have excellent properties for printhead robustness, and their inherently hydrophilic nature is advantageous for supplying ink to the nozzle chambers 24 by capillary action.

Returning to the details of the nozzle chamber 24, it will be seen that a nozzle opening 26 is defined in a roof of each nozzle chamber 24. Each nozzle opening 26 is generally elliptical and has an associated nozzle rim 25. The nozzle rim 25 assists with drop directionality during printing as well as reducing, at least to some extent, ink flooding from the nozzle opening 26. The actuator for ejecting ink from the nozzle chamber 24 is a heater element 29 positioned beneath the nozzle opening 26 and suspended across a pit 8. Current is supplied to the heater element 29 via electrodes 9 connected to drive circuitry in underlying CMOS layers of the substrate 2. When a current is passed through the heater element 29, it rapidly superheats surrounding ink to form a gas bubble, which forces ink through the nozzle opening 26. By suspending the heater element 29, it is completely immersed in ink when the nozzle chamber 24 is primed. This improves printhead efficiency, because less heat dissipates into the underlying substrate 2 and more input energy is used to generate a bubble.

As seen most clearly in FIG. 1, the nozzles are arranged in rows and an ink supply channel 27 extending longitudinally along the row supplies ink to each nozzle in the row. The ink supply channel 27 delivers ink to an ink inlet passage 15 for each nozzle, which supplies ink from the side of the nozzle opening 26 via an ink conduit 23 in the nozzle chamber 24.

The MEMS fabrication process for manufacturing such printheads was described in detail in U.S. Pat. No. 7,303,930, the contents of which are herein incorporated by reference.

The operation of printheads having suspended heater elements is described in detail in the Applicant's U.S. Pat. No. 7,278,717, the contents of which are incorporated herein by reference.

The Applicant has also described thermal bubble-forming inkjet printheads having embedded heater elements. Such printheads are described in, for example, U.S. Pat. No. 7,246,876 and US 2006/0250453, the contents of which are herein incorporated by reference.

The Applicant's thermal inkjet printheads may be generally characterized by having one or more of the following features: (i) suspended heater element; (ii) heater element having a mass of less than 1 nanogram, optionally less than 500 picograms; (iii) actuation energy of less than 500 nJ, optionally less than 200 nJ; and (iv) titanium nitride or titanium aluminium nitride heater element.

The solvent-based ink compositions of the present invention work optimally in combination with the Applicant's thermal inkjet printheads, as described above. However, their use is not limited to the Applicant's thermal printheads. The solvent-based ink compositions described herein may also be used in conventional thermal bubble-forming inkjet printheads, such as those sold commercially by Hewlett-Packard and Canon.

In the case of conventional scanning thermal inkjet printheads (or, indeed, the Applicant's pagewidth printheads), the present invention may relate to an ink cartridge for a inkjet printer comprising any of the solvent-based ink compositions described above. The ink cartridge may optionally comprise a thermal inkjet printhead integrated with therewith.

For the sake of completeness, printers incorporating the Applicant's thermal inkjet printheads are described in, for example, U.S. Pat. No. 7,201,468; U.S. Pat. No. 7,360,861; U.S. Pat. No. 7,380,910; and U.S. Pat. No. 7,357,496, the contents of each of which are herein incorporated by reference.

Figure 4:
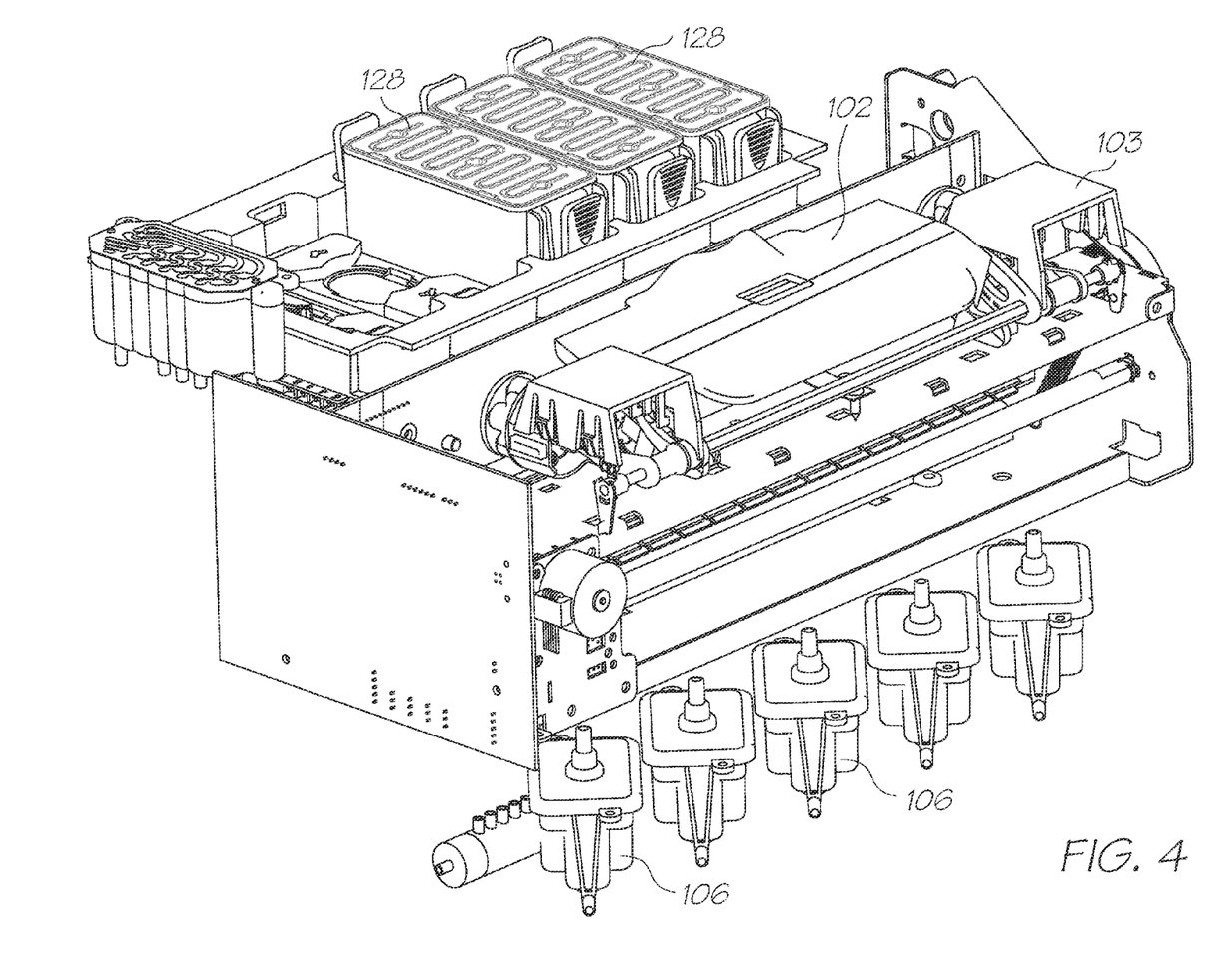
FIG. 4 is perspective view of a thermal inkjet print engine.

FIG. 4 shows a print engine 103 for a thermal inkjet printer, as described in Applicant's U.S. application Ser. No. 12/062,514, the contents of which is herein incorporated by reference. The print engine 103 includes a removable print cartridge 102, comprising a pagewidth printhead, and a bank of user-replaceable ink cartridges 128. Each color channel typically has its own ink reservoir 128 and a corresponding pressure-regulating chamber 106 for regulation of a hydrostatic pressure of ink supplied to the printhead. Hence, the print engine 103 has five ink reservoirs 128 and five corresponding pressure-regulating chambers 106. Typical color channel configurations for this five-channel print engine 103 are CMYKK or CMYK(IR). Each ink cartridge 128 may comprise a solvent-based ink composition as described herein. Accordingly, the printer is suitable for printing onto non-porous (e.g. vinyl) substrates.

Although fluidic connections between the various components are not shown in FIG. 4, it will be appreciated that these connections are made with suitable hoses in accordance with the fluidics system described in, for example, U.S. application Ser. No. 12/062,514.

It will further be appreciated that, whilst ink compositions according to the present invention were designed for use in thermal inkjet printheads, they may also be useful in other types of inkjet printhead, such as the Applicant's bend-actuated inkjet printheads described in, for example, U.S. Pat. No. 7,416,280; U.S. Pat. No. 6,902,255; US 2008/0129793; and US 2008/0225082, the contents of which are herein incorporated by reference.

Experimental

Evaluation of Bubble-Forming Solvents

Using an "open pool boiler" test apparatus, and after evaluating a wide range of solvents, the solvents described in Table A were shown to generate bubbles in a thermal inkjet device. (An "open pool boiler" test apparatus essentially comprises one or more inkjet nozzles as shown in FIG. 2 without the roof structure 21).

Some physical characteristics of each solvent are also provided in Table A.

general, all ink compositions had a good film appearance on the vinyl surface before testing, with the exception of the carbitol acetate and hexylacetate compositions, which exhibited some minor irregularities.

Water rubs were performed using cotton buds dipped in water, which were then rubbed across the films. The number of rubs needed to damage the film was noted or, if no damage observed, stopped at 100 rubs. All ink compositions showed excellent resistance to the water rub test, having no significant change after >100 water rubs. (Usually, a number of rubs >50 is considered to be excellent).

Adhesion tests were made by using a razor blade to mark six vertical lines crossed by six horizontal lines in a grid (cross hatch). Scotch® tape was then placed over the grid and removed rapidly. The damage (if any) to the film was noted and a given an adhesion rating: 0 (poor)-5 (excellent). All ink compositions had an adhesion rating of 5.

TABLE A

Solvents generating bubbles in thermal inkjet test device

| Solvent name | Other name | Bpt (° C.) | Evaporation rate* | Viscosity (cP) | Surface tension (dynes/cm) |
|---|---|---|---|---|---|
| MEK | Methyl ethyl ketone | 80 | 4.03 | 0.43 | 24.18 |
| Dipropylene glycol methyl ether (DPM) | Di(propylene glycol) methyl ether, mixture of isomers | 187 | 0.02 | 3.44 | 28.25 |
| Butyl DiGlycol Acetate | 2-(2-Butoxyethoxy) ethyl acetate | 245 | 0.001 | 3.6 | 30.5 |
| Methoxy Propyl Acetate | Propylene glycol monomethyl ether acetate | 145 | 0.33 | 1.2 | 28.2 |
| Cyclohexanone | Cyclohexanone | 155 | 0.3 | 2 | 34 |
| Carbitol Acetate | Diethylene glycol monoethyl ether acetate | 219 | 0.008 | 2.67 | 31.4 |
| Hexyl acetate | Hexyl acetate | 170 | 0.208 | 0.9 | 27.3 |
| N-Methyl-2 Pyrrolidone | 1-Methyl-2-pyrrolidone | 202 | 0.03 | 1.65 | 40.1 |
| Ethanol | ethyl alcohol | 78 | 1.7 | 1.1 | 22.18 |
| Water (comparative) | | 100 | 0.36 | 0.9 | 72 |

*relative to n-butyl acetate which has a value of 1.

Although all solvents listed in Table A generated bubbles in the test device, it was observed that the addition of ethanol to each solvent significantly improved bubble formation.

A preferred solvent combination providing excellent bubble formation was N-methyl-2-pyrrolidine (NMP) and ethanol in a 1:1 ratio.

Adhesion of Solvents to Vinyl

Each of the solvents listed in Table A was tested for adhesion to a vinyl surface. Four large drops of solvent were placed on uncoated vinyl and left for 60 seconds under ambient conditions. The solvents were wiped gently with a tissue and any mark on the vinyl surface was noted.

With the exception of water and ethanol, all solvents listed in Table A left a film impression on vinyl. The solvents are listed below in order of the severity with which a film impressions was left on the vinyl surface.

MEK>NMP>Cyclohexanone>>Hexyl acetate=Carbitol acetate=Butyldiglycol acetate=Methoxypropyl acetate>Dipropylene glycol methyl ether Film Properties of Single Solvent Ink Compositions In a further adhesion test, ink compositions were formulated consisting of a single solvent (from Table A) and a dye. Each ink composition consisted of: 97 wt. % solvent and 3 wt. % Bricosol red KIOB (Solvent Red 8).

The inks were applied as 6 micron wet films to the vinyl surface. Water rubs, adhesion and appearance were noted. In The drying time of each film at room temperature was also noted and the results are shown in Table B:

TABLE B

Drying time of various single solvent ink compositions on vinyl

| Ink Composition | Solvent | Drying Time |
|---|---|---|
| 1 | cyclohexanone | <10 s |
| 2 | dipropyleneglycol methyl ether | >120 s |
| 3 | butyldiglycol acetate | >120 s |
| 4 | methoxypropyl acetate | 20 s |
| 5 | carbitol acetate | >120 s |
| 6 | hexyl acetate | <20 s |
| 7 | N-methyl pyrrolidinone | <10 s |

By way of comparison, a standard solvent-based piezo cyan ink was measured to have a drying time of >120 s under the same test conditions.

In all ink compositions prepared, the water resistance and adhesion to vinyl were excellent, and performed at least as well as a piezo solvent-based standard.

On the basis of bubble formation and film properties, an ink composition comprising NMP and ethanol in a 1:1 ratio was considered to be an excellent composition for thermal inkjets. However, all ink compositions comprising an adhesion-promoting solvent and ethanol were considered to be suitable for ejection using a thermal inkjet device and, indeed, showed good drop ejection characteristics from such a device.

Addition of Film Appearance Improvers

Several ink compositions were prepared using the preferred solvent system of NMP and ethanol, and additionally including a nonionic surfactant (Zonyl® FSO). These ink compositions are described in Table C.

TABLE C

Ink compositions comprising NMP, ethanol, colorant and surfactant

| | | | With Zonyl FSO | | | |
|---|---|---|---|---|---|---|
| Code | Other name | Function | SBOB1-17-1 Blue | SBOB1-17-2 Red | SBOB1-17-3 Yellow | SBOB1-17-4 Black |
| N-Methyl-2 Pyrrolidone | 1-Methyl-2-pyrrolidone | Solvent | 48.4 | 48.4 | 48.4 | 48.4 |
| Ethanol | | Solvent | 48.4 | 48.4 | 48.4 | 48.4 |
| Zonyl FSO | | Surfactant | 0.2 | 0.2 | 0.2 | 0.2 |
| Bricasol red K10B | Solvent red 8 | dye colourant | | 3 | | |
| Bricosol blue K2GV | Solvent blue 70 | dye colourant | 3 | | | |
| Bricosol yellow KRV | Solvent yellow 82 | dye colourant | | | 3 | |
| Bricosol black NB | Solvent black 27 | dye colourant | | | | 3 |
| Total | | | 100 | 100 | 100 | 100 |

Each ink composition was placed in a suitable ink reservoir and printed onto vinyl using a thermal inkjet printhead of the type described above, having suspended beam heater elements. All printouts had excellent film appearance, water resistance and adhesion to the vinyl surface.

The addition of surfactant improved the film appearance of the ink on vinyl, compared to ink compositions in which the surfactant was absent.

Other surfactants shown to have a beneficial effect in improving the film appearance of printouts on vinyl were Tego Wet® 450, Tegoglide® 410, Twin® 400, Tego Wet® 270 and Tegoglide® 482.

Similarly, incorporation of a vinyl polymer into the ink composition showed some improvement in the film appearance of printouts. For example, the addition of UCAR™ VYHH (a high molecular weight copolymer of vinyl chloride and vinyl acetate) to the ink compositions improved the film appearance of printouts onto a vinyl substrate. However, polymer additives were not considered to be essential for acceptable film appearance on vinyl print media.

Pigment Colorants

A CMYK set of inks was prepared using pigment dispersions combined with hexyl acetate solvent. The ink compositions are described in Table D.

TABLE D

Ink compositions comprising pigments

| Code | Other name | Function | Pigment content (dispersion) | SBOB1-23-1 | SBOB1-23-2 | SBOB1-23-3 | SBOB1-23-4 |
|---|---|---|---|---|---|---|---|
| Hexyl acetate | | Solvent | | 80 | 84.3 | 81 | 82 |
| SJD-C254 | pigment 15:3 | Pigment dispersion | 16% | 20 | | | |
| SJD-R019 | pigment V19 | Pigment dispersion | 19% | | 15.7 | | |
| SJD-Y251 | pigment Y151 | Pigment dispersion | 18% | | | 18.75 | |
| SJD-BK17 | pigment PK-7 | Pigment dispersion | 17% | | | | 17.65 |
| Total | | | | 100 | 100 | 100 | 100 |

In all four colors, adhesion to vinyl and water resistance were shown to be excellent. Furthermore, jettable ink compositions could be prepared using ink compositions according to the present invention and comprising pigment-based colorants.

It will, of course, be appreciated that the present invention has been described by way of example only and that modifications of detail may be made within the scope of the invention, which is defined in the accompanying claims.

The invention claimed is:

1. A method of ejecting ink from a thermal inkjet printhead, said method comprising the steps of:
   (i) supplying an ink to at least one nozzle chamber of said printhead; and
   (ii) actuating a heater element in said nozzle chamber and heating said ink to a temperature sufficient to form a bubble therein, thereby causing said ink to be ejected from a nozzle opening associated with said nozzle chamber, wherein said ink is a solvent-based ink composition consists only of:
   (a) 20-80 wt. % of a compound of formula (A);

(A)

wherein:
$R^1$ is $C_{1-6}$ alkyl; and
each of $R^2$, $R^3$ and $R^4$ is independently selected from H, $C_{1-6}$ alkyl, halogen, OH, and $C_{1-6}$ alkoxy;
(b) 10-70 wt. % of a $C_{1-6}$ alcohol;
(c) 0.01-25 wt. % of a colorant; and
(d) 0.01-10 wt. % of a surfactant.

2. The method of claim 1, wherein said ink is ejected onto a non-porous or a semi-porous substrate.

3. The method of claim 2, wherein said ink adheres to said substrate.

4. The method of claim 2, wherein said substrate is a plastics substrate.

5. The method of claim 2, wherein said substrate is comprised of untreated vinyl or polyester.

6. The method of claim 1, wherein said heater element has a mass of less than 1 nanogram.

7. The method of claim 1, wherein said heater element is suspended in said ink chamber, such that said ink composition envelops said heater element.

8. The method of claim 1, wherein an actuation energy for said heater element is less than 500 nJ.

9. The method of claim 1, wherein said printhead is a stationary pagewidth printhead.

10. The method of claim 1, wherein said printhead comprises at least 50,000 nozzles.

11. The method of claim 1, wherein:
$R^1$ is $C_{1-6}$ alkyl; and
each of $R^2$, $R^3$ and $R^4$ is H.

12. The method of claim 1, wherein said compound of formula (N-methyl-2-pyrrolidinone or N-ethyl-2-pyrollidinone.

13. The method of claim 1, wherein said $C_{1-6}$ alcohol is ethanol.

14. An inkjet printer comprising:
an ink reservoir containing a respective ink; and
a thermal inkjet printhead in fluid communication with said ink reservoir, wherein said ink is a solvent-based ink composition consists only of:

(a) 20-80 wt. % of a compound of formula (A);

(A)

wherein:
$R^1$ is $C_{1-6}$ alkyl; and
each of $R^2$, $R^3$ and $R^4$ is independently selected from H, $C_{1-6}$ alkyl, halogen, OH, and $C_{1-6}$ alkoxy;
(b) 10-70 wt. % of a $C_{1-6}$ alcohol;
(c) 0.01-25 wt. % of a colorant; and
(d) 0.01-10 wt. % of a surfactant.

15. The inkjet printer of claim 14, wherein said thermal inkjet printhead comprises a plurality of nozzles, each of said plurality of nozzles comprising:
a nozzle chamber containing said ink, said nozzle chamber having a nozzle opening for ejection of said ink; and
a heater element in contact with said ink, said heater element being configured for heating said ink to a temperature sufficient to form a bubble therein and thereby cause ejection of said ink from said nozzle opening.

* * * * *